(12) United States Patent
Wang et al.

(10) Patent No.: US 10,692,185 B2
(45) Date of Patent: Jun. 23, 2020

(54) GENERATIVE METHODS OF SUPER RESOLUTION

(71) Applicant: Magic Pony Technology Limited, London (GB)

(72) Inventors: Zehan Wang, London (GB); Wenzhe Shi, London (GB); Ferenc Huszar, London (GB); Robert David Bishop, London (GB)

(73) Assignee: Magic Pony Technology Limited, London (GB)

( * ) Notice: Subject to any disclaimer, the term of this patent is extended or adjusted under 35 U.S.C. 154(b) by 0 days.

(21) Appl. No.: 15/856,923

(22) Filed: Dec. 28, 2017

(65) Prior Publication Data
US 2018/0122048 A1    May 3, 2018

Related U.S. Application Data

(63) Continuation of application No. PCT/GB2017/050728, filed on Mar. 16, 2017.

(30) Foreign Application Priority Data

Mar. 18, 2016  (GB) .................................. 1604672.4

(51) Int. Cl.
*G06T 3/40* (2006.01)
(52) U.S. Cl.
CPC .......... *G06T 3/4076* (2013.01); *G06T 3/4046* (2013.01); *G06T 3/4053* (2013.01); *G06T 2207/20081* (2013.01)
(58) Field of Classification Search
None
See application file for complete search history.

(56) References Cited

U.S. PATENT DOCUMENTS

| 5,134,396 A | 7/1992 | Sirat et al. |
| 5,638,125 A | 6/1997 | Ahn et al. |

(Continued)

FOREIGN PATENT DOCUMENTS

| CN | 101621683 A | 1/2010 |
| CN | 102148996 A | 8/2011 |

(Continued)

OTHER PUBLICATIONS

Reed, Scott, et al. "Generative adversarial text to image synthesis." arXiv preprint arXiv:1605.05396 (May 2016). (Year: 2016).*

(Continued)

*Primary Examiner* — Andrae S Allison
(74) *Attorney, Agent, or Firm* — Brake Hughes Bellermann LLP

(57) ABSTRACT

A method for training an algorithm to process at least a section of received visual data using a training dataset and reference dataset. The method comprises an iterative method with iterations comprising: generating a set of training data using the algorithm; comparing one or more characteristics of the training data to one or more characteristics of at least a section of the reference dataset; and modifying one or more parameters of the algorithm to optimise processed visual data based on the comparison between the characteristic of the training data and the characteristic of the reference dataset. The algorithm may output the processed visual data with the same content as the at least a section of received visual data. Some aspects and/or implementations provide for improved super-resolution of lower quality images to produce super-resolution images with improved characteristics (e.g. less blur, less undesired smoothing) compared to other super-resolution techniques.

20 Claims, 2 Drawing Sheets

(56) References Cited

U.S. PATENT DOCUMENTS

| | | | |
|---|---|---|---|
| 5,673,213 A | 9/1997 | Weigl | |
| 5,831,678 A | 11/1998 | Proctor | |
| 6,075,884 A | 6/2000 | Lubin et al. | |
| 6,470,097 B1 | 10/2002 | Lai et al. | |
| 6,735,336 B2 | 5/2004 | Avni et al. | |
| 7,133,568 B2 | 11/2006 | Nikitin et al. | |
| 7,477,800 B2 | 1/2009 | Avidan et al. | |
| 7,623,731 B2 | 11/2009 | Lim et al. | |
| 7,676,441 B2 | 3/2010 | Matsugu et al. | |
| 8,037,010 B2 | 10/2011 | Jaros et al. | |
| 8,311,967 B1 | 11/2012 | Lin et al. | |
| 8,331,615 B2 | 12/2012 | Furukawa et al. | |
| 8,467,599 B2 | 6/2013 | El | |
| 8,731,255 B2 | 5/2014 | El-Baz | |
| 9,208,539 B2 | 12/2015 | Choudhury et al. | |
| 9,342,870 B2* | 5/2016 | Lin | G06T 5/002 |
| 9,824,421 B2 | 11/2017 | Ragozin et al. | |
| 9,904,889 B2 | 2/2018 | Eliasmith et al. | |
| 9,906,787 B2 | 2/2018 | Amon et al. | |
| 10,019,642 B1* | 7/2018 | Navarrete Michelini | G06T 3/40 |
| 10,181,092 B2* | 1/2019 | Shao | G06T 5/50 |
| 10,523,955 B2 | 12/2019 | Wang et al. | |
| 2003/0071908 A1 | 4/2003 | Sannoh et al. | |
| 2004/0136567 A1 | 7/2004 | Billinghurst et al. | |
| 2004/0150538 A1 | 8/2004 | Kim et al. | |
| 2004/0218834 A1 | 11/2004 | Bishop et al. | |
| 2005/0063461 A1 | 3/2005 | Lee et al. | |
| 2005/0200757 A1 | 9/2005 | Pica et al. | |
| 2007/0172452 A1 | 7/2007 | Klucher et al. | |
| 2007/0223887 A1 | 9/2007 | Kanamori et al. | |
| 2009/0034622 A1 | 2/2009 | Huchet et al. | |
| 2009/0067491 A1 | 3/2009 | Sun et al. | |
| 2009/0110285 A1 | 4/2009 | Elad et al. | |
| 2009/0232213 A1 | 9/2009 | Jia | |
| 2010/0002087 A1 | 1/2010 | Shin et al. | |
| 2010/0150229 A1 | 6/2010 | Francois et al. | |
| 2010/0183217 A1 | 7/2010 | Seung et al. | |
| 2011/0299770 A1 | 12/2011 | Vaddadi et al. | |
| 2011/0304687 A1 | 12/2011 | Joshi et al. | |
| 2012/0288015 A1 | 11/2012 | Zhang et al. | |
| 2012/0294369 A1 | 11/2012 | Bhagavathy et al. | |
| 2013/0121416 A1* | 5/2013 | He | H04N 19/597 375/240.14 |
| 2013/0128111 A1 | 5/2013 | Corral-Soto | |
| 2013/0223734 A1 | 8/2013 | Tuzel et al. | |
| 2014/0177706 A1 | 6/2014 | Fernandes et al. | |
| 2014/0204996 A1 | 7/2014 | Spears et al. | |
| 2014/0301661 A1 | 10/2014 | Voronov et al. | |
| 2014/0369401 A1 | 12/2014 | Minoo et al. | |
| 2015/0015569 A1 | 1/2015 | Jung et al. | |
| 2015/0086109 A1 | 3/2015 | Paris et al. | |
| 2015/0181159 A1 | 6/2015 | Matsuyama | |
| 2015/0238148 A1* | 8/2015 | Georgescu | A61B 5/7267 600/408 |
| 2016/0078600 A1 | 3/2016 | Perez Pellitero et al. | |
| 2016/0140408 A1 | 5/2016 | Shen et al. | |
| 2017/0132760 A1* | 5/2017 | Kothule | G06T 3/4046 |
| 2017/0193680 A1* | 7/2017 | Zhang | G06T 11/60 |
| 2017/0345130 A1* | 11/2017 | Wang | G06T 3/4046 |
| 2018/0075581 A1 | 3/2018 | Shi et al. | |
| 2018/0121769 A1* | 5/2018 | Huszar | G06K 9/66 |
| 2018/0129893 A1 | 5/2018 | Son et al. | |
| 2018/0139458 A1 | 5/2018 | Wang et al. | |
| 2018/0197089 A1* | 7/2018 | Krasser | G06N 5/04 |
| 2018/0293713 A1* | 10/2018 | Vogels | G06T 7/0002 |

FOREIGN PATENT DOCUMENTS

| | | | |
|---|---|---|---|
| CN | 103369349 A | 10/2013 | |
| EP | 0618737 A2 | 10/1994 | |
| EP | 1720358 A2 | 11/2006 | |
| EP | 2557789 A2 | 2/2013 | |
| EP | 2806374 A1 | 11/2014 | |
| JP | 1021385 A | 1/1998 | |
| KR | 20030009575 A | 2/2003 | |
| WO | 9739417 A2 | 10/1997 | |
| WO | 0033207 A1 | 6/2000 | |
| WO | 02/005208 A3 | 1/2002 | |
| WO | 03094034 A1 | 11/2003 | |
| WO | 2008133951 A2 | 11/2008 | |
| WO | 2013143396 A1 | 10/2013 | |
| WO | 2014052740 A1 | 4/2014 | |
| WO | 2015193531 A1 | 12/2015 | |
| WO | 2017/158363 A1 | 9/2017 | |

OTHER PUBLICATIONS

Xie, Junyuan, Linli Xu, and Enhong Chen. "Image denoising and inpainting with deep neural networks." Advances in neural information processing systems. 2012. (Year: 2012).*

Doug et al "Learning a Deep Convolutional Network for image Super-Resolution," by Dong et al., Computer Vision, ECCV2014, vol. 8692 of the Series Lecture Notes in Computer Science, 2014, 16 pages. (Year: 2014).*

International Search Report for Application No. GB1604672.4, dated Oct. 24, 2016, 6 pages.

International Search Report and Written Opinion for PCT Application No. PCT/GB2017/050728, dated Aug. 21, 2017, 18 pages.

Dong, "Image Super-Resolution Using Deep Convolutional Networks", IEEE Transactions on Pattern Analysis and Machine Intelligence, vol. 38, No. 2, Feb. 1, 2016, 14 pages.

Liang, et al., "Incorporating Image Degeneration Modeling With Multitask Learning for Image Super-Resolution", IEEE International Conference on Image Processing, Sep. 27, 2015, pp. 2110-2114.

Qu, et al., "Single Image Super-Resolution via Convolutional Neural Network and Total Variation Regularization", MultiMedia Modeling. Lecture Notes in Computer Science, vol. 951, Jan. 1, 2016, pp. 28-38.

Sheikh, et al., "An Information Fidelity Criterion for Image Quality Assessment Using Natural Scene Statistics", IEEE Transactions on Image Processing, vol. 14, No. 12, Dec. 1, 2005, pp. 2117-2128.

Sumali, et al., "Single Image Super Resolution by No-Reference Image Quality Index Optimization in PCA Subspace", IEEE 12th International Colloquium on Signal Processing and Its Applications, Mar. 4, 2016, pp. 183-187.

"CS231n Convolutional Neural Networks for Visual Recognition", retrieved on Feb. 16, 2015, XP055488606, 2 pages.

Wikipedia, "Universal Approximation Theorem", Retrieved from http://web.archive.org/web/20100701194338/https://en.wikipedia.org/wiki/Universal_approximation_theorem, Jun. 10, 2010, 2 pages.

Atreya, et al., "Novel Lossy Compression Algorithms With Stacked Autoencoders", retrieved from at http://cs229.stanford.edu/proj2009/AtreyaOshea.pdf, Dec. 11, 2009, 5 pages.

Bevilacqua, et al., "Video Super-Resolution via Sparse Combinations of Key-Frame Patches in a Compression Context", 30th Picture Coding Symposium (PCS), Dec. 8, 2013, 5 pages.

Bishop, et al., "Super-Resolution Enhancement of Video", International Workshop on Artificial Intelligence and Statistics (AISTATS 2003), No. 9th, Jan. 2003, pp. 1-8.

Cayton, "Algorithms for manifold learning", Jun. 15, 2005, 17 pages.

Cheng, et al., "Fast Video Super-Resolution Using Artificial Neural Networks", 8th IEEE, IET International Symposiu on Communication Systems, Networks and Digital Signal Processing, Jul. 18, 2012, 4 pages.

Chopra, et al., "Learning a similarity metric discriminatively, with application to face verification", In IEEE Conference on Computer Vision and Pattern Recognition (CVPR), 2005, 8 pages.

Dong, et al., "Compression Artifacts Reduction by a Deep Convolutional Network", IEEE International Conference on Computer Vision, Apr. 27, 2015, pp. 576-584.

Gendy, et al., "A Fast Algorithm for Image Restoration Using a Recurrent Neural Network with Bound-Constrained Quadratic Optimization", The Seventh Australian and New Zealand Intelligent Information Systems Conference, Nov. 18, 2001, pp. 111-116.

(56) References Cited

OTHER PUBLICATIONS

Kim, et al., "Example-based Learning for Single-Image Super-Resolution and JPEG Artifact Removal", Technical Report No. TR-173, retrieved on Jun. 1, 2016 from http://www.kyb.mpg.de/fileadmin/user_upload/files/publications/attachments/TechReport-173, Aug. 2008, 28 pages.

Kwon, et al., "Adaptive Postprocessing Algorithm in Block-Coded Images Using Block Classification and MLP", IEEE Transactions on Fundamentals of Electronics, Communications and Computer Sciences, Engineering Sciences Society, vol. E86-A, No. 4, Apr. 1, 2003, pp. 961-967.

Hu, et al., "An Adaptive Image Denoising Model Based on Tikhonov and TV Regularizations", Advances in Multimedia, vol. 2014, Jan. 1, 2014, 11 pages.

Hu, et al. "Nonparametric Scene Parsing: Label Transfer via Dense Scene Alignment", IEEE Conference on Computer Vision and Pattern Recognition, Jun. 2009, 8 pages.

Long et al. "Fully convolutional networks for semantic segmentation", IEEE Conference on Computer Vision and Pattern Recognition (CVPR), 2015, pp. 3431-3440.

Matikainen, et al., "Model Recommendation for Action Recognition", IEEE Conference on Computer Vision and attem Recognition, 2012, pp. 2256-2263.

Mittal, et al., "No-Reference Image Quality Assessment in the Spatial Domain", IEEE Transactions on Image Processing, vol. 21, Issue 12, Dec. 2012, pp. 4695-4708.

Muneyasu, et al., "Image Restoration Using Layered Neural Networks and Hopfield Networks", Proceedings of the International Conference on Image Processing, vol. 2, Oct. 23, 1995, pp. 33-36.

Nielsen, "A Visual Proof That Neural Nets Can Compute Any Function", Neural Networks and Deep Learning, Chapter 4, XP055562061, Feb. 6, 2015, 32 pages.

Pan, et al., "A Survey on Transfer Learning", IEEE Transactions on Knowledge and Data Engineering, vol. 22, No. 10, Oct. 2010, pp. 1345-1359.

Park, et al., "Super-Resolution Image Reconstruction: A Technical Overview", IEEE Signal Processing Magazine, vol. 20, No. 3, May 1, 2003, pp. 21-36.

Rudin, et al., "Non-Linear Total Variation Based Noise Removal Algorithms", Physica D, vol. 60, No. 1-4, Nov. 1, 1992, pp. 259-268.

Shi, et al., "Is the Deconvolution Layer the Same as a Convolutional Layer?", retrieved on Mar. 11, 2019 from https://arxiv.org/ftp/arxiv/papers/1609/1609_07009.pdf, Sep. 22, 2016, 7 pages.

Torralba, et al., "80 million tiny images: a large dataset for nonparametric object and scene recognition", IEEE Transactions on Pattern Analysis and Machine Intelligence, vol. 30, Issue 11, Nov. 2008, 12 pages.

Wagstaff, et al., "Constrained K-means clustering with background knowledge", Proceedings of the Eighteenth International Conference on Machine Learning, 2001, pp. 577-584.

Wang, et al. "Deep Networks for Image Super-Resolution with Sparse Prior", International Conference on Computer Vision (ICCV), Dec. 1, 2015, 9 pages.

Wang, et al., "Self-Tuned Deep Super Resolution", 2015 IEEE Conference on Computer Vision and Pattern Recognition Workshops, XP032795527, 2015, 8 pages.

Yang, et al., "Coupled Dictionary Training for Image Super-Resolution", IEEE Transactions on Image Processing, vol. 21, Issue 8, Aug. 2012, 27 pages.

Yang, "Image super-resolution via sparse representation", IEEE Transactions on Image Processing, vol. 19, Issue 11, Nov. 2010, 51 pages.

Yang, et al., "Single-Image Super-Resolution Reconstruction via Learned Geometric Dictionaries and Clustered Sparse Coding", IEE Transactions on Image Processing, vol. 21, No. 9, Sep. 1, 2012, pp. 4016-4028.

Zeyde, et al., "On Single Image Scale-Up Using Sparse-Representations", Curves and Surfaces, Springer, 2012, pp. 711-730.

Zuo, et al., "Content-Adaptive Resolution Enhancement of Compressed Video with Encoder-Generated Side Information", International Conference on Consumer Electronics, Jan. 9, 2008, pp. 1-2.

Kim, et al., "Neural Concurrent Subsampling and Interpolation for Images", 1999 IEEE TENCON, vol. 2, Sep. 15-17, 1999, pp. 1327-1330.

Jiang, "Image Compression with Neural Networks—A Survey", Signal Processing: Image Communication, vol. 14, No. 9, 1999, pp. 737-760.

Cramer, "Neural Networks for Image and Video Compression: A Review", European Journal of Operational Research, vol. 108, No. 2, Jul. 16, 1998, pp. 266-282.

Office Action for European Application No. 16706416.1, dated Dec. 17, 2019, 6 pages.

Office Action for European Application No. 17713057.2, dated Jan. 8, 2020, 5 pages.

Kavukcuoglu, et al., "Learning Invariant Features Through Topographic Filter Maps", CVPR 2009, Jun. 20, 2009, pp. 1605-1612.

Osendorfer, et al., "Image Super-Resolution With Fast Approximate Convolutional Sparse Coding", ICONIP 2014, pp. 250-257.

Peyrard, et al., "A Comparison Between Multi-Layer Perceptrons and Convolutional Neural Networks for Text Image Super-Resolution", Proceedings of the 10th International Conference on computer Vision Theory and Applications, Jan. 1, 2015, pp. 84-91.

\* cited by examiner

GENERATIVE METHODS OF SUPER RESOLUTION

CROSS REFERENCE TO RELATED APPLICATIONS

This application is a continuation of, and claims priority to, International Patent Application No. PCT/GB2017/050728, filed on Mar. 16, 2017, which claims priority to United Kingdom Application No. GB 1604672.4, filed on Mar. 18, 2016, the contents of both of which are incorporated herein by reference.

TECHNICAL FIELD

The present disclosure relates to a method for training an algorithm to process visual data using a plurality of datasets.

BACKGROUND

Machine learning is the field of study where a computer or computers learn to perform classes of tasks using the feedback generated from the experience the machine learning process gains from computer performance of those tasks.

Typically, machine learning is classified into three main categories: (i) supervised learning; (ii) unsupervised learning and (iii) reinforcement learning.

Supervised machine learning is concerned with a computer learning one or more rules or functions to map between example inputs and desired outputs as predetermined by an operator or programmer, usually where a data set containing the inputs is labelled.

Unsupervised learning may be concerned with determining a structure for input data, for example when performing pattern recognition, and typically uses unlabelled data sets.

Reinforcement learning may be concerned with enabling a computer or computers to interact with a dynamic environment, for example determining how well a machine performs the learning.

Various hybrids of these categories are possible, such as "semi-supervised" machine learning where a training data set has only been partially labelled.

For unsupervised machine learning, there is a range of possible applications such as, for example, the application of computer vision techniques to image processing or video enhancement. Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values. The machine learning algorithm must be provided with enough data so as to be able to correctly learn and model for the dimensionality of the problem they are trying to solve, without providing too many features (which can result in too many dimensions being considered by the machine learning process during training). The user must also determine the desired structure of the learned or generalised function, for example whether to use support vector machines or decision trees.

The use of unsupervised or semi-supervised machine learning approaches are often used when labelled data is not readily available, or where the system generates new labelled data from unknown data given some initial seed labels.

For example, for the case where machine learning is used for image enhancement, using dictionary representations for images, techniques are generally referred to as dictionary learning. In dictionary learning, where sufficient representations, or atoms, are not available in a dictionary to enable accurate representation of an image, machine learning techniques can be employed to tailor dictionary atoms such that they can more accurately represent the image features and thus obtain more accurate representations.

When using machine learning where there is an objective function and optimisation process, for example where using sparse coding principles, a training process is used to find optimal representations that can best represent a given signal or labelling (where the labelling can be externally provided such as in supervised or semi-supervised learning or where the labelling is implicit within the data as for unsupervised learning), subject to predetermined initial conditions such as a level of sparsity.

Current methods of neural-network super resolution use a least squares objective or a variant thereof such as peak signal-to-noise ratio. Generally the training objective is represented by:

$$\min_{\theta} \mathbb{E}_{x,y} \| y - \hat{y}(x; \theta) \|_2^2 \qquad \text{Equation 1}$$

where x is a low resolution image, y is a high resolution image, and $\hat{y}$ is an estimate of the high resolution image generated by a neural network with the parameters of $\theta$.

Least squares methods struggle when there are multiple equivalently probable solutions to the problem. For example, where there are multiple equivalently good solutions to the problem, a low resolution image may provide enough detail to be able to determine the content of the image, however not in enough details so as to be able to precisely determine the location of each object within a high-resolution version of the image.

SUMMARY

Aspects and/or implementations are set out in the appended claims.

Some aspects and/or implementations provide for super-resolution of lower quality images so as to produce super-resolution images which have improved characteristics (e.g. less blur, less undesired smoothing) compared to other super-resolution techniques.

Some aspects and/or implementations can improve the effectiveness of synthesising content using machine learning techniques.

These and other aspects and implementations are also described herein.

Certain aspects and/or implementations seek to provide techniques for generating hierarchical algorithms that can be used to enhance visual data based on received input visual data and a plurality of pieces of training data.

Other aspects and/or implementations seek to provide techniques for machine learning.

According to a first aspect, there is provided a computer-implemented method for training an algorithm to process at least a section of received visual data. The method comprises an iterative method with each iteration comprising the steps of: generating a set of processed data using the algorithm; comparing one or more characteristics of the processed data to one or more characteristics of at least a section of a reference dataset; and modifying one or more parameters of the algorithm to optimise the output visual data by changing parameters obtained from a comparison between the characteristic of the processed data and the characteristic of the reference dataset.

Comparing one or more characteristics of the processed data to one or more characteristics of at least a section of a reference dataset may comprise matching a distribution of processed data (which may comprise reconstructed visual data) to a distribution of the reference dataset (which may comprise high resolution visual data). In some implementations, comparing the one or more characteristics of the processed data to the one or more characteristics of at least a section of the reference dataset may comprise evaluating pixel-to-pixel differences, or evaluating differences (or similarities) at some feature level. Since the set of processed data is used in training it may be referred to herein as a "set of training data".

The algorithm may output visual data which includes the same content (e.g. the same semantic content) as the at least a section of received visual data. In other words there may be a level of consistency ("data consistency") between the output visual data and the at least a section of received visual data. For example in some implementations a down-sampled version of the output visual data may correspond to the at least a section of received visual data. In some implementations, the output visual data may be linked to the section of received visual data by convolutional feature matching. Those skilled in the art will appreciate that the term "content", as used herein, is not limited to pixel-by-pixel information, and may refer to other data calculated using an appropriate function, e.g. semantic content, or feature(s) output from a neural network.

In some implementations the algorithm is trained using a training dataset, which may be a low-quality training dataset comprising a plurality of low-quality visual data. Similarly, in some implementations the reference dataset may be a high-quality reference data set comprising a plurality of high-quality visual data. Where the term training data is used, any of the terms processed data, or processed output data may be used. Similarly, where the term training dataset is used, the term input training data may be used.

Some implementations provide for a method of training an algorithm by iterating a number of times so as to optimise the results of the algorithm subject to a comparison between a generated set of training data and a reference data set. Using parameters based upon the optimisation the algorithm may be modified so as to output an enhanced quality version of received lower quality visual data.

In some implementations, the training dataset may comprise a plurality of visual data and the reference dataset may comprise a plurality of visual data. Furthermore, in some implementations, the plurality of high-quality visual data of the high-quality reference dataset may not be increased quality versions of the low-quality visual data of the low-quality training dataset.

In some implementations, the use of a plurality of different visual data, both low and high quality, ensures the algorithm may be optimised based on specific criteria, such as the type of the input visual data and the content of the input visual data. This may enable the method to select a subset of each of the sets of visual data so as to optimise the amount of time and resources required to obtain favourable results.

In some implementations, the method may further comprise the step of receiving at least a section of the training dataset. Similarly, the method may also further comprise the step of receiving at least a section of the reference dataset.

In some implementations, receiving the data sets enables them to be stored remotely instead of being stored in memory of a device configured to perform the method.

In some implementations, the step of generating a set of training data using the algorithm may use all the data from the training dataset.

In some implementations, using all the visual data from the training dataset enables the algorithm to produce results based on the widest set of possible data, giving a bigger field of data for the comparison and optimisation of the algorithm.

In some implementations, the received visual data may be low-resolution visual data and the visual data may have a higher-resolution than the received visual data.

In certain implementations, the algorithm may be directed towards specifically increasing the resolution of the input visual data as opposed to focussing on other aspects which affect the quality of visual data.

In some implementations, the visual data is produced by the algorithm being configured to be used for any of removing compression artefacts, dynamic range enhancement, image generation and synthesis, image inpainting, image de-mosaicing, or denoising.

In some implementations, the algorithm may be directed towards any of removing compression artefacts, dynamic range inference, image inpainting, image de-mosaicing, and denoising so as to allow for enhancing the quality of the received visual data in a plurality of ways.

In some implementations, comparing the one or more characteristics of the training data to the one or more characteristics of the reference dataset further comprises training a denoising auto-encoder algorithm via a least-squares procedure to capture the statistical characteristics. In some implementations it may comprise an adversarial training procedure or a regularised auto-encoder algorithm so as to minimise any differences between the statistical characteristics. The adversarial training procedure may employ a binary classifier that discriminates between enhanced visual data and high-quality reference data. Similarly, in some implementations, the comparison between the one or more characteristics of the enhanced training data and the one or more characteristics of the reference dataset may amount to evaluating the classification performance of this discriminator algorithm.

A number of methods of comparing the characteristics may be used, depending on implementation, so as to optimise the comparison between the two data sets. In some implementations, optimising the comparison enables the parameters to the algorithm to be modified so as to ensure any output visual data is representative of the input visual data.

In some implementations, the one or more characteristics of the enhanced training data and the one or more characteristics of the reference dataset may be representative of the same characteristics, such as in some implementations being a statistical distribution.

In some implementations, using the same characteristics ensures an accurate comparison between the two data sets, so as to optimise the parameters of the algorithm and produce high-quality visual data more representative of the low-quality visual data provided as an input.

In some implementations, the algorithm preserves the content of the visual data, which may be achieved by comparing one or more characteristics of an input of the algorithm and one or more characteristics of an output of the algorithm. Comparing the input and output of the algorithm may involve assessing the similarity between one or more characteristics of an input of the algorithm and one or more characteristics of an output of the algorithm, where the one or more characteristics may be calculated by a characteristic algorithm. The characteristic algorithm is developed using learning approaches, such as sufficient statistics based on activations in a convolutional neural network whereby the one or more characteristics may be a subset of the representation of visual data in a complete or overcomplete basis, such as a wavelet basis.

In some implementations, comparing the input and the output of the algorithm ensures the algorithm produces high-quality visual data more representative of the low-quality visual data provided as an input.

In some implementations, the algorithm may preserve the content of the visual data by modifying one or more parameters of the algorithm using an auxiliary objective function which may be a Lagrange multiplier.

In some implementations, preserving the content of the visual data ensures the output visual data resembles a higher quality version of the low-quality visual data provided as an input to the algorithm.

In some implementations, the algorithm is hierarchical and comprises a plurality of layers furthermore, the layers are any of sequential, recurrent, recursive, branching or merging.

Having a number of layers in some implementations, which may or may not be sequential, recurrent, recursive, branching or merging allows different levels of processing to occur at different times and the layers can work in parallel, ensuring optimal efficiency when enhancing the resolution of the visual data In some implementations, the extracting of features is based on a predetermined extraction metric.

In some implementations, enabling a variety of features to be extracted as set by the predetermined extraction metric ensures the enhancement can be tailored to a specific system.

As such, in some of these implementations the computational expense can be increased or decreased appropriately based on system resources.

In some implementations, the algorithm is pre-trained, fine-tuned, or trained using a learned approach.

In some implementations, hierarchical or non-hierarchical algorithms can be substantially accurate and therefore enable a more accurate reconstruction, for example produce higher quality visual data from the low-quality visual data that is transmitted, for example where quality can be measured by resolution, a perceptual measure or metric determining that the quality is sufficiently aesthetically pleasing or by a low reproduction error rate in comparison to the original high-quality visual data. In another example, the hierarchical or non-hierarchical algorithms can produce higher quality versions of visual data using the fidelity data. In some optional implementations, a down-sampled version of the resulting visual data comes out to be the same or similar as a down-sampled version of the original visual data. In some implementations, using a learned approach can substantially tailor the hierarchical model or models for each portion of visual data.

In some implementations, the learned approach comprises machine learning techniques. The algorithm is a non-linear or hierarchical algorithm, which may comprise one or more of convolutional neural networks, recurrent neural networks, random forests, or dictionary learning based methods.

In some implementations, non-linear models can be substantially accurate in reconstructing visual data than dictionary-based approaches. In these implementations, through using a learning-based approach, i.e. an approach that does not rely on pre-defined visual data features and operators, the model(s) can be optimised for each section or sequence of sections.

In some implementations, the training of convolutional neural networks can be more computationally complex than dictionary learning for a similar accuracy, but the resulting model or algorithm can also be more flexible in representing visual data while using fewer coefficients for the reconstruction. In some implementations, the resultant convolutional neural network model to be transmitted alongside the lower-quality visual data can be both smaller and can be more accurate in the reconstruction of the higher-quality visual data.

Some aspects can provide an improved technique for generating reconstruction parameters that can be used, when converting original high-quality visual data into a down-sampled low-quality visual data, to allow recreation of higher quality visual data without significant loss in quality, for example having a low reconstruction error in comparison with the original visual data, and with a reduction in visual data transferred over a network. In such aspects, the application of such a technique can reduce the data transmitted when transmitting visual data in comparison with existing techniques while enabling reproduction of the visual data at its original quality without significant loss in quality in comparison to the original visual data (where quality can be defined by objective metrics such as error rate, PSNR and SSIM as well as subjective measures) or based on a perception measure or metric rather than on a pixel-wise comparison of images. In such aspects, such a proposed technique can allow minimal changes to be made to the overall infrastructure of service providers, as it can augment most existing compression techniques, and can provide advantages in encoding and streaming applications.

In some implementations, the hierarchical algorithm uses super-resolution techniques and/or a spatio-temporal approach.

In some implementations for use for a section of visual data, the example based model may be a neural network and can use spatio-temporal convolution. In some implementations, separating visual data into a series of sections allows for the individual sections to be down-sampled thus reducing the visual data size, thereby allowing for lower quality sections to be transmitted as re-encoded visual data in the original or a more optimal codec but at a lower quality. In some implementations, a spatio-temporal network can allow an improvement in performance by exploiting the temporal information in the visual data and, for example, within a similar scene in sequential sections of visual data, there may be stationary sections of background in the sequential sections providing information relevant for the higher-quality version of that scene such that temporally consecutive sections can be used to super resolve one section.

In some implementations, the plurality of input sections may comprise at least one low-quality input or a plurality of low-quality inputs, wherein quality can be measured subjectively.

Aspects and/or implementations include a computer program product comprising software code to effect the method and/or apparatus of other aspects and/or implementations herein described.

It should be noted that in some aspects and/or implementations, the terms model and/or algorithm and/or representation and/or parameters and/or functions can be used interchangeably.

It should also be noted that visual data, in some implementations, may comprise image and/or video data.

References to visual data can be references to video data and/or image data in some aspects and/or implementations and vice versa. References to low-quality and/or lower-quality can be references to low-resolution and/or lower-resolution in some aspects and/or implementations and vice versa. References to high-quality and/or higher-quality and/or highest quality and/or original quality can be references to high-resolution and/or higher-resolution and/or highest-resolution and/or original resolution and/or increased fidelity in some aspects and/or implementations and vice versa. References to sections can be references to frames and/or portions of frames in some aspects and/or implementations and vice versa. References to enhance or enhancement can be references to upscale and/or upscaling in some aspects and/or implementations and vice versa.

BRIEF DESCRIPTION OF FIGURES

Implementations will now be described, by way of example only with reference to the accompanying drawing, in which.

DETAILED DESCRIPTION

Figure 1:
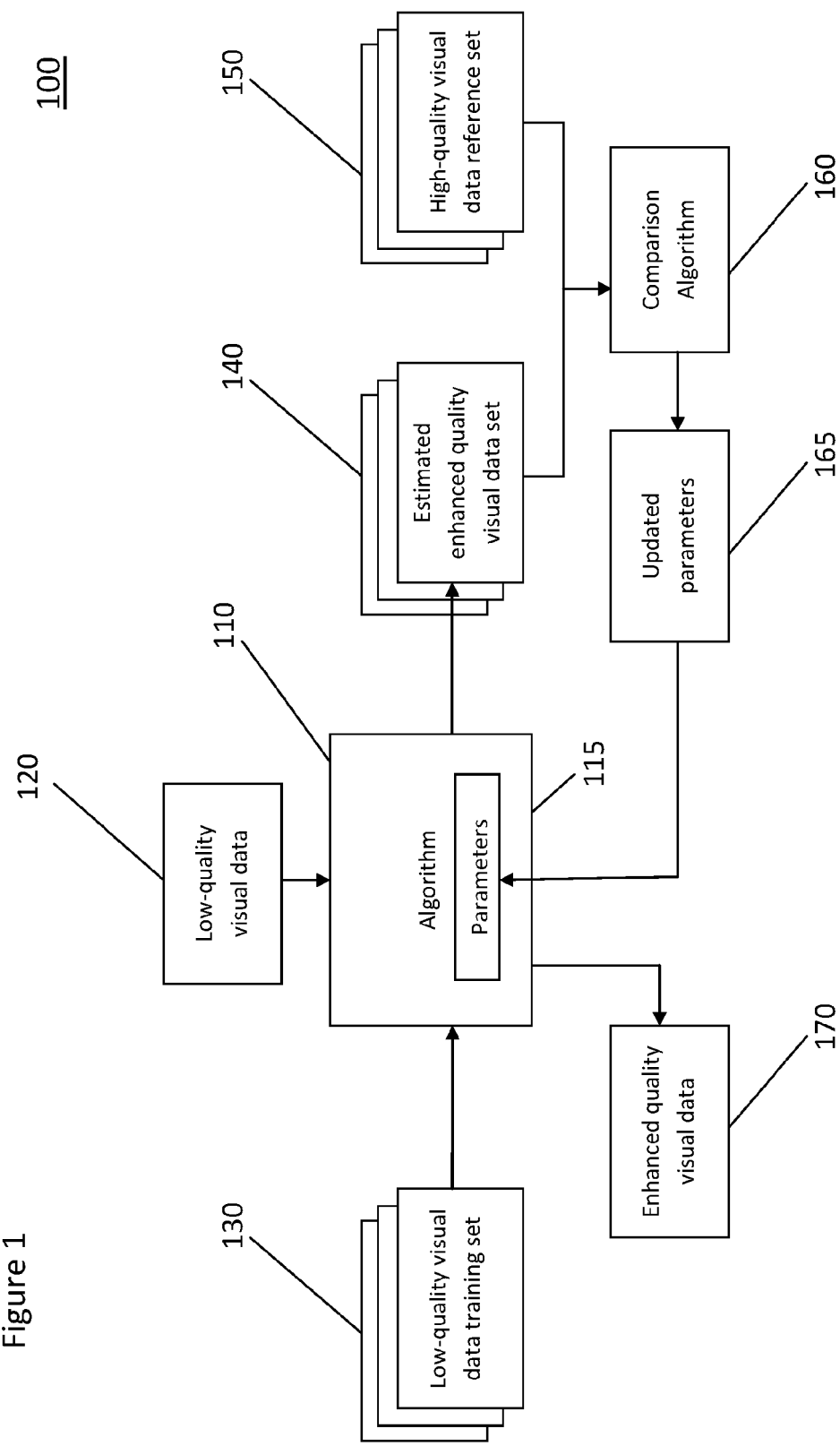
FIG. 1 is a flow chart showing a method of training an algorithm to enhance the quality of visual data using a plurality of datasets.

Various implementations will now be described in detail with reference to the Figures referenced above.

In some implementations it is possible to overcome the problem of having multiple probable solutions to a specific piece of input visual data by computing the maximum-a-posteriori ('MAP') solution. As mentioned above, a least-squares method picks an average of all possible solutions, thereby resulting in an output which may not accurately represent a higher quality version of the inputted visual data. In contrast a MAP-trained network would pick a most probable output when compared to a training data set. MAP estimation can be difficult as it requires knowledge of the entire distribution of natural images and because it has to generate realistic textures even when not present in the lower-quality visual data.

The MAP solution may be modified and other techniques used, such as generative modelling, to improve the efficiency and reduce the difficulties mentioned previously. In some implementations objective function for MAP estimation may be represented as:

$$\min_{\theta} -\mathbb{E}_x \log p(\hat{y}(x; \theta) | x) \qquad \text{Equation 2}$$

where x is low quality visual data, ŷ is an estimate of the high quality visual data when passed through a neural network with the parameters of θ, and p is the distribution of natural visual data.

This may be decomposed using the Bayes' rule to:

$$\max_{\theta} \mathbb{E}_x \log p(x | \hat{y}(x; \theta)) + \mathbb{E}_x \log p(\hat{y}(x; \theta)) \qquad \text{Equation 3}$$

where the first term, $\mathbb{E}_x \log p(x|\hat{y}(x; \theta))$, is the likelihood and the second term, $\mathbb{E}_x \log p(\hat{y}(x; \theta))$, is the prior. In some implementations, the likelihood may represent the low quality visual data, x, should be the same as the estimated high quality visual data, ŷ, when ŷ has been down-sampled.

In some implementations, Equation 3 may be modified to omit the first term (i.e. the likelihood) to give:

$$\max_{\theta} \mathbb{E}_x \log p(\hat{y}(x; \theta)) \qquad \text{Equation 4}$$

This gives an unsupervised generative training objective with no reference to the original high quality visual data. Knowledge regarding the high quality visual data is encapsulated within the image prior distribution, p.

In some implementations, this objective function required no reference to corresponding input and output pairs, and relies on comparing probability distributions, therefore resulting in an unsupervised learning or a generative modelling approach.

Further implementations may use this approach to generate high quality versions of inputted low quality visual data by training an algorithms so that the objective function, for example the objective function described by Equation 4, is optimised. In some implementations, only low-quality data is required along with a high-quality reference data set which may contain unrelated visual data.

Implementations will now be described in relation to FIG. 1 which shows a method 100 used to train an algorithm 110. In this implementation, processing involves increasing the quality of the input visual data 120. It will be appreciated the method may be able to process visual data in a number of ways, such as by creating photorealistic outputs, removing noise from received visual data, and generating or synthesising new images. An algorithm 110 receives at least one section of low-quality visual data 120 used to initialise the algorithm 110 with a set of parameters 115. The algorithm 110 may also receive a low-quality visual data training set 130. In some implementations the plurality of low-quality visual data training set 130 may be a selection of low quality images, frames of video data or rendered frames. The person skilled in the art will appreciate other types of low-quality visual data may be received by the algorithm 110.

The low-quality visual data training set 130 may be received by the algorithm 110 from an external source, such as the Internet, or the low-quality visual data training set 130 may be stored in a memory of a device configured to perform the method 100.

The low-quality visual data 120 is used as a training data set and provided to the algorithm 110 which, using the parameters 115, seeks to produce estimated enhanced quality visual data set 140 corresponding to the low-quality visual data training set 130. In some implementations only a subset of the low-quality visual data 120 may be used when producing the estimate enhanced quality visual data set 140. The estimated enhanced quality visual data set 140 may comprise a set of visual data representing enhanced quality versions of the corresponding lower quality visual data from a subset of the low-quality visual data training set 130. In some implementations, the entire low-quality visual data training set 130 may be used.

In some implementations, the enhanced quality visual data set 140 may be used as an input to comparison algorithm 160, along with a high quality visual data reference set 150. The high-quality visual data reference set 150 may be received by the algorithm 110, from an external source, such as the Internet, or the high-quality visual data reference set 150 may be stored in a memory of a device configured to perform the method 100.

The comparison algorithm 160 may use a plurality of characteristics determined from the high-quality visual data reference set 150 and the estimated enhanced quality visual data set 140 to determine similarities and differences between the two data sets 140, 150. The comparison may be made between empirical probability distributions of visual data. The plurality of characteristics use may include sufficient statistics computed across subsets of visual data.

The comparison algorithm 160 may utilise an adversarial training procedure such as the one used to train Generative Adversarial Network ('GAN'). In some implementations, such an algorithm may employ a discriminator trained to discriminate between data items sampled from the high-quality visual data reference set 150 and those sampled from the estimated enhanced quality visual data set 140. The classification accuracy of this discriminator may then form the basis of the comparison.

In yet another implementation, the comparison algorithm 160 may involve training denoising auto-encoders via a least-squares procedure to capture the statistical characteristics of the high-quality visual data reference set 150 and the estimate enhanced visual data set 140. These auto encoders may then be utilised to estimate gradients of the Kullback Leibler divergence between the two distributions.

In a further implementation, the comparison algorithm 160 may involve moment matching which may directly minimise differences between the plurality of characteristics, which may be the sufficient statistics mentioned previously, determined from the high-quality visual data reference set 150 and the estimated enhanced quality visual data set 140.

In some implementations, the comparison algorithm 160 may compute the maximum mean discrepancy in a reproducing Kernel Hilbert space between the high-quality visual data reference set 150 and the estimated enhanced quality visual data set 140.

In some implementations, the comparison algorithm 160 produces updated parameters 165 which can be used to replace the parameters 115 of the algorithm 110. Using the updated parameters 165, the method 100 may iterate, seeking to reduce the differences between the plurality of characteristics determined from the high-quality visual data 130 and the estimated enhanced quality visual data 140, each time using the updated parameters 165 produced by the comparison algorithm 160.

The method 100 continues to iterate until the algorithm 110 produces an estimated enhanced quality visual data 140 representative of high quality visual data corresponding to the low-quality visual data training set 130. After training the algorithm 110, an enhanced quality visual data 170 may be output wherein the enhanced quality visual data 170 corresponds to an enhanced quality version of the at least one section of low-quality visual data 120.

Some implementations are used to apply a style transfer to the input visual data. For example, input visual data may be a computer graphics rendering and the method 100 may be used to process the computer graphics rendering. Using a photorealistic set of reference data 150 the output of the algorithm 110 may appear to have photo-real characteristics so as to represent a photo-real version of the computer graphics rendering.

Some implementations may be used to recover information from corrupted or lower-quality input visual data, by using a reference data set to recover estimates of the corrupted or visual content.

Some implementations may be used for the removal of compression artefacts; dynamic range inference; image inpainting; image de-mosaicing and denoising. Thereby allowing for a range of visual data to be processed, each with different quality degrading characteristics. It will be appreciated other characteristics which affect the quality of the visual data may be enhanced by the algorithm. Furthermore, in some implementations, the algorithm may be configured to process the visual data consisting of one or more of the above-mentioned quality characteristics.

It should also be appreciated that specific combinations of the various features described and defined in any aspects can be implemented and/or supplied and/or used independently Some of the example implementations are described as processes or methods depicted as flowcharts. Although the flowcharts describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 2:
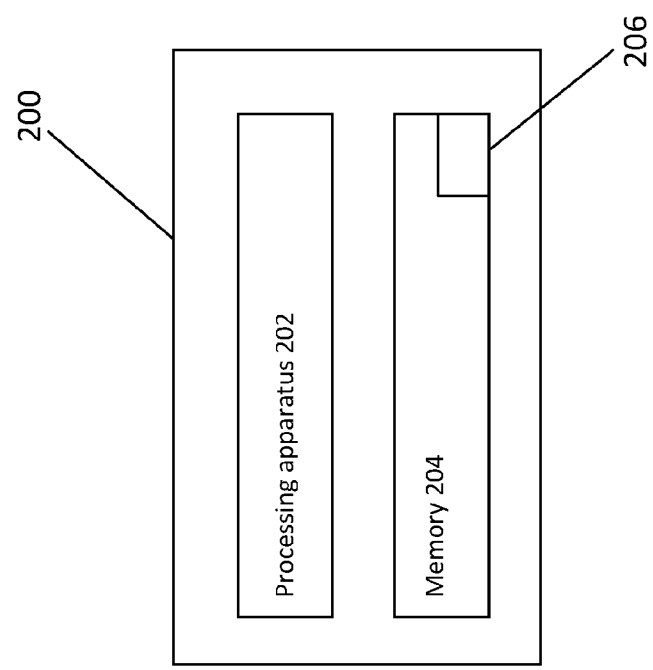
FIG. 2 shows an apparatus comprising a processing apparatus and memory according to an exemplary implementation.

FIG. 2 shows an apparatus 200 comprising a processing apparatus 202 and memory 204 according to an exemplary implementation. Computer-readable code 206 may be stored on the memory 204 and may, when executed by the processing apparatus 202, cause the apparatus 200 to perform methods as described here, for example a method with reference to FIG. 1.

The processing apparatus 202 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. In some implementations, the processing apparatus may be, for example, programmable hardware with embedded firmware. The processing apparatus may include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 202 is coupled to the memory 204 and is operable to read/write data to/from the memory 204. The memory 204 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative implementations may be implemented as program modules or functional processes including routines, programs, objects, components, data structures, etc., that perform specific tasks or implement specific functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example implementations may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fiber, or other suitable transmission medium known in the art. The example implementations are not limited by these aspects in any given implementation.

Further implementations are summarized in the following examples:

Example 1

A method for training an algorithm to process at least a section of received visual data using a training dataset and reference dataset, an iterative method with each iteration comprising the steps of: generating a set of training data using the algorithm; comparing one or more characteristics of the training data to one or more characteristics of at least a section of the reference dataset; and modifying one or more parameters of the algorithm to optimise processed visual data based on the comparison between the characteristic of the training data and the characteristic of the reference dataset; wherein the algorithm outputs the processed visual data with the same content as the at least a section of received visual data.

Example 2

The method of example 1, wherein the training dataset comprises a plurality of visual data.

Example 3

The method of any previous example, wherein the reference dataset comprises a plurality of visual data.

Example 4

The method of example 3, wherein the plurality of visual data of the reference dataset are not increased quality versions of the visual data of the training dataset.

Example 5

The method of any previous example, further comprising the step of receiving at least a section of the training dataset.

Example 6

The method of any previous example, further comprising the step of receiving at least a section of the reference dataset.

Example 7

The method of any previous example, wherein the step of generating a set of training data using the algorithm uses all the data from the training dataset.

Example 8

The method of any previous example, wherein the received visual data is low-resolution visual data.

Example 9

The method of any previous example, wherein the processed visual data has a higher-resolution than the received visual data.

Example 10

The method of any previous example, wherein the processed visual data is produced by the algorithm being configured to be used for any of: removing compression artefacts; dynamic range enhancement; image generation and synthesis; image inpainting; image de-mosaicing; and denoising.

Example 11

The method of any previous example, wherein comparing the one or more characteristics of the training data to the one or more characteristics of the reference dataset further comprises training a denoising auto-encoder algorithm via a least-squares procedure to capture the statistical characteristics.

Example 12

The method of any of examples 1 through 10, wherein comparing the one or more characteristics of the enhanced training data to the one or more characteristics of the reference dataset further comprises an adversarial training procedure.

Example 13

The method of any previous example, wherein comparing the one or more characteristics of the training data to the one or more characteristics of the reference dataset further comprises using a regularised auto-encoder algorithm to minimise any differences between the statistical characteristics.

Example 14

The method of example 12, wherein the adversarial training procedure employs a binary classifier that discriminates between enhanced visual data and reference data.

Example 15

The method of any previous example, wherein the comparison between the one or more characteristics of the enhanced training data and the one or more characteristics of the reference dataset amounts to evaluating the classification performance of this discriminator algorithm.

Example 16

The method of any previous example, wherein the one or more characteristics of the training data and the one or more characteristics of the reference dataset are representative of the same characteristics.

Example 17

The method of any previous example, wherein the one or more characteristics of the training data and the one or more characteristics of the reference dataset are a statistical distribution.

Example 18

The method of any previous example, wherein the algorithm preserves the content of the visual data.

Example 19

The method of any previous example, wherein the algorithm preserves the content of the visual data by comparing one or more characteristics of an input of the algorithm and one or more characteristics of an output of the algorithm.

Example 20

The method of example 19, wherein the step of comparing involves assessing the similarity between one or more characteristics of an input of the algorithm and one or more characteristics of an output of the algorithm.

Example 21

The method of examples 19 or 20, wherein the one or more characteristics are calculated by a characteristic algorithm

Example 22

The method of example 21, wherein the characteristic algorithm is developed using learning approaches, such as sufficient statistics based on activations in a convolutional neural network.

Example 23

The method of any of examples 19 through 22, wherein the one or more characteristics are a subset of the representation of visual data in a complete or overcomplete basis, such as a wavelet basis.

Example 24

The method of any previous example, wherein the algorithm preserves the content of the visual data by modifying one or more parameters of the algorithm using an auxiliary objective function.

Example 25

The method of example 24, wherein the auxiliary objective function is a Lagrange multiplier.

Example 26

The method of any previous example, wherein the algorithm is hierarchical and comprises a plurality of layers.

Example 27

The method of example 26, wherein the layers are any of sequential, recurrent, recursive, branching or merging.

Example 28

The method of any previous example, wherein the extracting of features is based on a predetermined extraction metric.

Example 29

The method of any previous example, wherein the algorithm is pre-trained, fine-tuned, or trained using a learned approach.

Example 30

The method of example 29, wherein the learned approach comprises machine learning techniques.

Example 31

The method of any previous example, wherein the algorithm is a non-linear hierarchical algorithm.

Example 32

The method of any previous example, wherein the algorithm comprises any of one or more: convolutional neural networks, recurrent neural networks, random forests, or dictionary learning based methods.

Example 33

The method of any previous example, wherein the algorithm uses super-resolution techniques.

Example 34

The method of any previous example, wherein the algorithm uses a spatio-temporal approach.

Example 35

A method of any previous example, wherein the plurality of input sections comprises at least one low-quality input.

Example 36

A method of any previous example, wherein the plurality of input sections comprises a plurality of low-quality inputs

Example 37

A method according to any one of the preceding example, further comprising receiving the received visual data, processing the received visual data to provide the processed visual data, and outputting the processed visual data.

Example 38

A method substantially as hereinbefore described in relation to FIG. 1.

Example 39

Apparatus for carrying out the method of any previous example.

Example 40

A computer program product comprising software code for carrying out the method of any of examples 1 to 38.

Example 41

Apparatus comprising: at least one processor; and at least one memory including computer program code which, when executed by the at least one processor, causes the apparatus to perform the method of any one of examples 1 to 38.

Example 42

A computer-readable medium having computer-readable code stored thereon, the computer-readable code, when executed by at least one processor, causing the performance of the method of any one of examples 1 to 38.

What is claimed is:

1. A method for training an algorithm to process at least a section of received visual data using a training dataset and a reference dataset, the method being an iterative method with each iteration comprising:
   generating a set of training data from the training dataset using the algorithm;
   determining one or more characteristics of the training data, wherein the one or more characteristics include a statistical distribution of the training data;
   determining one or more characteristics of the reference dataset, wherein the one or more characteristics include a statistical distribution of the reference dataset;
   comparing the one or more characteristics of the training data to the one or more characteristics of the reference dataset; and
   modifying one or more parameters of the algorithm to optimise processed visual data based on the comparison between the one or more characteristics of the training data and the one or more characteristics of the reference dataset,
   wherein the algorithm outputs the processed visual data with the same content as the at least a section of received visual data.

2. The method of claim 1, wherein the training dataset comprises a plurality of visual data.

3. The method of claim 1, wherein the reference dataset comprises a plurality of visual data.

4. The method of claim 1, wherein generating a set of training data using the algorithm uses all the data from the training dataset.

5. The method of claim 1, wherein the received visual data is low-resolution visual data.

6. The method of claim 1, wherein the processed visual data has a higher-resolution than the received visual data.

7. The method of claim 1, wherein the processed visual data is produced by the algorithm being configured to be used for any of: removing compression artefacts; dynamic range enhancement; image generation and synthesis; image inpainting; image de-mosaicing; and denoising.

8. The method of claim 1, wherein comparing the one or more characteristics of the training data to the one or more characteristics of the reference dataset further comprises training a denoising auto-encoder algorithm via a least-squares procedure to capture the one or more characteristics.

9. The method of claim 1, wherein comparing the one or more characteristics of the training data to the one or more characteristics of the reference dataset further comprises an adversarial training procedure.

10. The method of claim 9, wherein the adversarial training procedure employs a binary classifier that discriminates between enhanced visual data and reference data.

11. The method of claim 1, wherein comparing the one or more characteristics of the training data to the one or more characteristics of the reference dataset further comprises using a regularised auto-encoder algorithm to minimise any differences between the one or more characteristics.

12. The method of claim 1, wherein the one or more characteristics of the training data and the one or more characteristics of the reference dataset are representative of the same characteristics.

13. The method of claim 1, wherein the algorithm preserves the content of the visual data.

14. The method of claim 1, wherein the algorithm preserves the content of the visual data by comparing one or more characteristics of an input of the algorithm and one or more characteristics of an output of the algorithm.

15. The method of claim 1, wherein comparing involves assessing the similarity between one or more characteristics of an input of the algorithm and one or more characteristics of an output of the algorithm.

16. The method of claim 15, wherein the one or more characteristics are calculated by a characteristic algorithm.

17. The method of claim 16, wherein the characteristic algorithm is developed using learning approaches, such as sufficient statistics based on activations in a convolutional neural network.

18. The method of claim 1, wherein comparing the one or more characteristics of the training data to the one or more characteristics of the reference dataset is performed without reference to corresponding input and output pairs.

19. An apparatus comprising:
at least one processor; and
at least one memory including computer program code which, when executed by the at least one processor, causes the apparatus to perform an iterative method, wherein to perform an iteration of the iterative method, the computer program code causes the apparatus to:
generate a set of training data using an algorithm for processing at least a section of received visual data using a training dataset and reference dataset;
determine one or more characteristics of the training data, wherein the one or more characteristics include a statistical distribution of the training data;
determine one or more characteristics of the reference dataset, wherein the one or more characteristics include a statistical distribution of the reference dataset;
compare the one or more characteristics of the training data to the one or more characteristics of the reference dataset; and
modify one or more parameters of the algorithm to optimise processed visual data based on the comparison between the one or more characteristics of the training data and the one or more characteristics of the reference dataset,
wherein the algorithm outputs the processed visual data with the same content as the at least a section of received visual data.

20. A non-transitory computer-readable medium having computer-readable code stored thereon, the computer-readable code, when executed by at least one processor, cause the processor to perform an iterative method, wherein to perform an iteration of the iterative method, the instructions cause the processor to:
generate a set of training data using an algorithm for processing at least a section of received visual data using a training dataset and reference dataset;
determine one or more characteristics of the training data, wherein the one or more characteristics include a statistical distribution of the training data;
determine one or more characteristics of the reference dataset, wherein the one or more characteristics include a statistical distribution of the reference dataset;
compare the one or more characteristics of the training data to the one or more characteristics of the reference dataset; and
modify one or more parameters of the algorithm to optimise processed visual data based on the comparison between the characteristic of the training data and the characteristic of the reference dataset,
wherein the algorithm outputs the processed visual data with the same content as the at least a section of received visual data.

* * * * *